United States Patent
De Angelis

(10) Patent No.: US 6,371,448 B1
(45) Date of Patent: Apr. 16, 2002

(54) ROPE DRIVE ELEMENT FOR DRIVING SYNTHETIC FIBER ROPES

(75) Inventor: Claudio De Angelis, Lucerne (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 09/686,074

(22) Filed: Oct. 11, 2000

(30) Foreign Application Priority Data

Oct. 29, 1999 (EP) ............................................. 99810978

(51) Int. Cl.$^7$ ................................................ B66D 1/30
(52) U.S. Cl. ..................... 254/374; 254/390; 29/892; 474/169; 474/174; 474/177; 474/190
(58) Field of Search ................................ 254/374, 390, 254/902; 29/892, 892.1; 474/169, 170, 174, 177, 178, 190; D8/360

(56) References Cited

U.S. PATENT DOCUMENTS

| | | | | |
|---|---|---|---|---|
| 1,429,491 A | * | 9/1922 | Davidson | 254/390 |
| 2,413,817 A | * | 1/1947 | Firth | 474/178 |
| 3,279,762 A | * | 10/1966 | Bruns | 474/178 |
| 3,962,280 A | * | 6/1976 | Eastcot et al. | 254/902 |
| 4,441,692 A | * | 4/1984 | Kovaliski | 254/390 |
| 4,589,683 A | * | 5/1986 | Dodge | 474/178 |
| 4,591,025 A | | 5/1986 | Honda | |
| 4,644,694 A | * | 2/1987 | Ujihara | 254/374 |
| 4,874,353 A | * | 10/1989 | Matsuuoka et al. | 474/168 |
| 4,905,361 A | * | 3/1990 | Morishita et al. | 29/892 |
| 5,792,294 A | * | 8/1998 | Randazzo et al. | 254/390 |
| 6,027,103 A | * | 2/2000 | Painter | 254/374 |
| 6,237,502 B1 | * | 5/2001 | Van Damme | 254/374 |

FOREIGN PATENT DOCUMENTS

| | | | | |
|---|---|---|---|---|
| DE | 1031943 | * | 9/1953 | 254/390 |
| DE | 1 575 574 | | 2/1970 | |
| DE | 1 900 707 | | 8/1970 | |
| DE | 86 08 764 U | | 5/1986 | |
| EP | 0 423 370 | | 1/1990 | |
| FR | 739343 | * | 1/1933 | 254/390 |
| GB | 895411 | * | 5/1962 | 254/390 |
| JP | 54104145 | | 8/1979 | |
| JP | 61 169479 | | 7/1986 | |
| JP | 09290983 | | 11/1997 | |
| SE | 181215 | * | 10/1962 | 254/390 |
| SU | 0707880 | * | 1/1980 | 254/390 |
| SU | 1713823 | * | 2/1980 | 254/390 |
| WO | 98/16881 | | 4/1998 | |

OTHER PUBLICATIONS

"Lifting appliances; groove profiles for wire rope sheaves", "Cranes; groove profiles for wire rope drums", (XP–000892874) Aug. 1977, (See attached European Search Report).

"Einführung in die DIN–normen", (XP 002132609), 1961, pp. 368, 370, 388, and 129, (See attached European Search Report).

"Oppervlakteruwheid", (XP 002312610), Apr. 1977, (See attached European Search Report).

* cited by examiner

Primary Examiner—Emmanuel M. Marcelo
(74) Attorney, Agent, or Firm—MacMillan, Sobanski & Todd, LLC

(57) ABSTRACT

A traction sheave for driving synthetic fiber ropes, preferably of an elevator installation, ensures a consistently good selected tractive capacity that is largely independent of external influences which reduce friction. At least part of the rope running surface on the traction sheave is provided with a selected roughness grade of N7 to N12. The selected roughness grade on the running surface is formed either by mechanical machining or by use of a suitable coating, preferably a plasma coating of corundum. For example, only the bed of the rope groove, the area of the flanks of the rope groove, or a wide area of the surface of the rope groove can be of the selected roughness grade. By correspondingly suitable arrangement of these differently formed rope grooves on the traction sheave, a desired tractive behavior can be systematically effected.

15 Claims, 2 Drawing Sheets

ROPE DRIVE ELEMENT FOR DRIVING SYNTHETIC FIBER ROPES

BACKGROUND OF THE INVENTION

The invention relates to a rope drive element for driving synthetic fiber ropes, preferably for a rope drive of an elevator installation.

Rope drives of this type are used in materials handling, especially in mining and the construction of cranes and elevators, or on aerial cableways and similar installations. It is known that the function of such rope drives is based on the driving force being transferred to the section of rope which is in contact at any time with the rope drive element, e.g. the traction sheave, rope drum, or similar. As the rope runs over the traction sheave it is bent, which causes compensating movements of the strands of a multi-layer rope.

The tractive capacity of such traction systems is restricted to operating ranges with sufficient frictional engagement between the traction sheave and rope. For example, on a rope traction elevator at least the difference in weight between the counterweight and car must be compensated by the frictional force on the traction sheave. The torque must also be transferred from the traction sheave to the rope by frictional engagement. For this reason, rope drives are designed in such manner that there is always sufficient tractive capacity for the various hoisting situations, e.g. normal travel, emergency stopping, loading, and unloading. The range of frictional engagement is limited in essence by a minimum and maximum so-called allowable system coefficient of friction between the traction sheave and the rope passing over it.

To create the appropriate coefficient of friction on the traction sheave, on conventional traction sheaves shaped grooves, e.g. a V-groove or an undercut semicircular groove, are cut whose shape exerts a specific pressure on steel ropes so that the rope is gripped to a greater or lesser degree. However, these traction sheave grooves cannot be used for completely synthetic suspension ropes. With these synthetic fiber ropes the desired coefficient of friction can be effected very well by the material used, as for example polyurethane, polyamide or similar, and its hardness. However, deviations in the coefficient of friction due to manufacture, or unforeseeable reductions in the system coefficient of friction due to oil, lubricants, or other liquids, could permanently impair the tractive capacity. Under unfavorable conditions it can therefore not be ruled out that the rope moves without the drive being able to affect this movement which is undesirable.

SUMMARY OF THE INVENTION

The present invention relates to a traction system for synthetic fiber ropes that ensures a consistently good tractive capacity that is largely independent of environmental influences.

According to the present invention, at least part of the rope running surface of the rope drive element has a surface of roughness grade N7 to N12.

With the traction system according to the present invention, the range of the system coefficients of friction of the combination of rope surface and running surface of the rope drive element, as for example a rope pulley, traction sheave, rope drum, deflected drive belt, or similar, is much smaller. Tests by the applicant have shown that with a rope running surface according to the present invention, the system coefficient of friction in operation under normal conditions increases and advantageously stays constant at this higher level even if lubricants or other liquids become present.

The surface peak-to-valley height and/or the grain size of the coating are adapted to the Shore hardness of the rope sheath in such manner that by suitable combination in each case any requirement in respect of wear or function can be effected. To increase the service life of the rope sheath and to stabilize the long-term tractive capacity of the rope drive, for smaller peak-to-valley heights a friction material with a lower Shore hardness is used, whereas for higher Shore hardnesses synthetic materials with harder surfaces are used for the sheaths of ropes or covering layers of strands.

To achieve the advantages according to the present invention it is of no significance whether the synthetic fiber rope runs on a cylindrical surface of the rope drive element or in a shaped groove, as for example a semicircular groove. It is equally possible for there to be rope grooves with different shapes of profile, as for example a double semicircular groove, in which a complementary double or twin rope runs, etc. The advantages that can be achieved with the present invention are, in principle, also achieved irrespective of the shape selected for the rope running surface of the rope drive element.

As it runs over a traction sheave, the synthetic fiber rope adapts itself to the profile of the semicircular groove and under load deforms on the contact surface, or in the profiled groove, from its original circular shape to an oval section. According to the deformation, the specific pressures of the rope in the rope groove over the cross section of the groove are not constant but increase toward the base of the groove. This distribution of the specific pressures is more pronounced with a greater load on the rope.

In an advantageous preferred further development of the present invention in its embodiment with shaped grooves, the surface according to the invention is formed over parts of a groove and used to effect the distribution of the load-dependent specific pressure over the cross section of the shaped groove to adjust the tractive behavior of the rope and thereby to fulfil a desired functional requirement.

Taking an embodiment of the traction sheave according to the present invention with semicircular shaped grooves, in a first version the surface according to the invention is limited to an angular range of, for example, 45° on the bed of the groove. The system coefficient of friction of this shape of groove is consequently high at the base of the groove and decreases toward the two sides. Correspondingly, the tractive behavior of a synthetic fiber rope running in this groove with no load on the rope is deliberately less pronounced than with a greater load acting on the synthetic fiber rope when the rope is pulled further into the shaped groove and lies on the bed of the groove with a maximum of specific pressure.

A second preferred exemplary embodiment of a shaped groove according to the present invention is to form the surface according to the invention symmetrically over two areas of the flanks of the cross section of the semicircular groove which are separated from each other. A load-dependent tractive behavior is also obtained with this embodiment. Here, in contrast to the exemplary embodiment previously described, the surface of the bed of the groove now has a lower peak-to-valley height. As a consequence, the traction of the heavily loaded synthetic fiber rope running in a semicircular groove formed in this way is less pronounced than that in the previous exemplary embodiment. On the other hand, the tractive behavior in the low load range is largely independent of the environmental influences.

In an advantageous third embodiment, the surface according to the invention is formed in an angular range of up to 140° over almost the entire cross section of the groove. According to the invention, a synthetic fiber rope running in this shape of groove displays a high level of tractive behavior which is independent of the load on the rope and the environmental influences acting on it.

The surface according to the invention, which corresponds to a roughness average of Ra=1.6 to 50 μm, can be obtained either by a mechanical finishing process suitable for creating a resistant surface texture, as for example knurling or similar, or else by coating the surface, preferably with corundum plasma.

Coating the rope running surface affords the additional possibility of subsequently converting conventional traction sheaves or rope drums for the advantageous tractive behavior with synthetic fiber ropes. The coating can either be applied to the desired areas on the steel groove or else appropriately flexible stiffeners are first plasma coated and then these pre-prepared plasma strips are attached to the desired point of the surface over which the rope runs by bonding with adhesive, fastening with screws, and/or some other means.

In a further development of the present invention the tractive behavior of a traction sheave with several shaped grooves formed in its circumference is systematically adapted to the selected requirements for the traction system by combining the embodiments of groove surfaces previously described.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
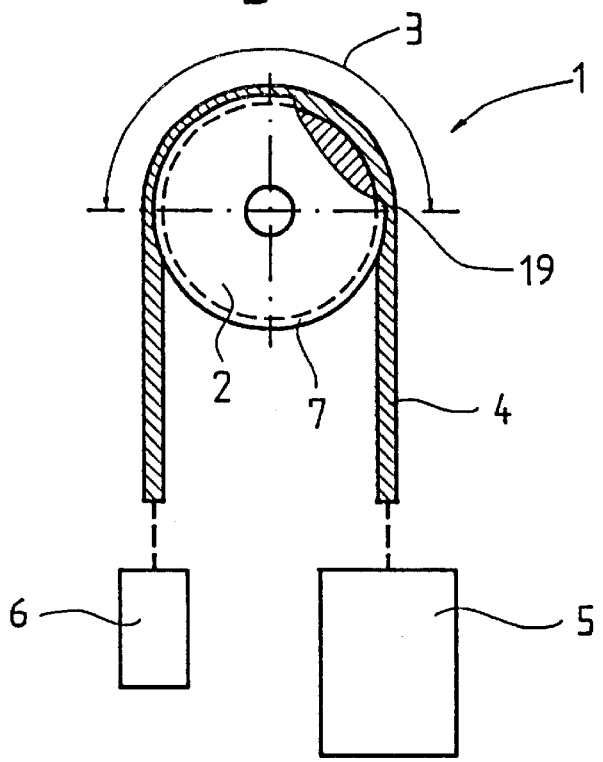
FIG. 1 is a schematic side elevation view of a traction sheave according to the present invention and a synthetic fiber stranded rope running over it.

FIG. 1 shows diagrammatically for an elevator installation a rope drive 1 for driving five synthetic fiber ropes 4 (only one rope is shown) passing over a traction sheave 2, each rope lying over an angle of wrap 3 of almost 180° on the outer circumference of the traction sheave. The five synthetic fiber ropes 4 serve as driven traction ropes for raising and lowering an elevator car 5 that is fastened to one end of each of the ropes, whereas an opposite end of each of the ropes is attached to a counterweight 6. As they run over the traction sheave 2 the five synthetic fiber ropes 4 are permanently loaded by the mass forces of the elevator car 5 and the counterweight 6. According to the present invention, the traction system illustrated comprising traction sheave 2 and the five synthetic fiber ropes 4 passing over it is so designed that under the load of car 5 and counterweight 6 sufficient frictional engagement is ensured to transfer the driving torque of a drive machine via the traction sheave to the synthetic fiber ropes.

On a rope traction elevator the maximum limit for the coefficient of friction is derived from the safety requirement that when the counterweight 6 strikes the buffers the ropes 4 slip on the traction sheave 2. This ensures that if the elevator car 5 travels beyond the upper stop it is not pulled under the ceiling of the hoistway headroom and the suspension rope 4 is not loaded to the limit of its breaking load even though the traction sheave 2 continues to turn. The result would be total failure of the rope. On the other hand, the coefficient of friction must not be below a minimum value, so that the difference in weight between the car 5 and the counterweight 6 can be neutralized on the traction sheave 2 by the frictional force components.

For this purpose, in the exemplary embodiment illustrated, to guide the synthetic fiber ropes 4, shaped grooves 7, 17 and 27 are formed on the outer circumference of the traction sheave 2 which have a shape of groove which essentially corresponds to the outer curvature of the hoisting rope 4, i.e. that part of the cross section of the rope lying on them. In the embodiments of the traction sheave 2 shown in FIGS. 2 through 3c, the rope grooves 7, 17 and 27 are formed as semicircular grooves.

Figure 2:
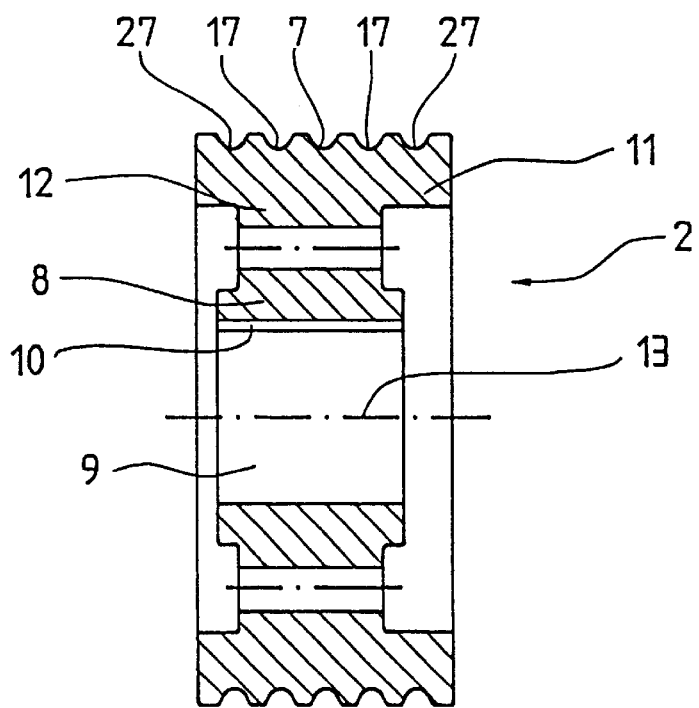
FIG. 2 is a cross-sectional view of the traction sheave shown in FIG. 1.

FIG. 2 illustrates a cross section of a first embodiment of the traction sheave 2 according to the present invention. The traction sheave 2 has a hub 8 with a hole 9 drilled centrally through it on axis of rotation 13 to take a drive shaft. The traction sheave 2 fits exactly on the drive shaft on which it is mounted and fastened in a non-rotating manner with a key (not shown) and keyway 10 so as to transmit the drive torque. A rim 11 having essentially the form of a hollow cylinder is connected monolithically via a perforated sheave body 12 to the hub 8.

Figure 3A:
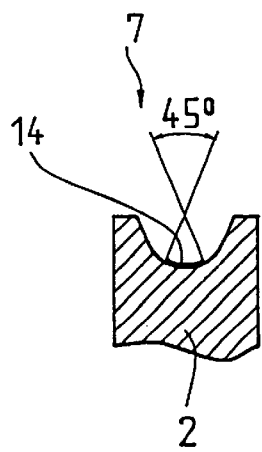
FIG. 3a is an enlarged fragmentary cross-sectional view of a traction sheave rope groove according to a first embodiment of the present invention.
Figure 3B:
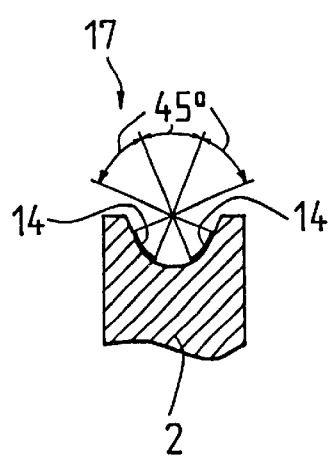
FIG. 3b is an enlarged fragmentary cross-sectional view of a traction sheave rope groove according to a second embodiment of the present invention.
Figure 3C:
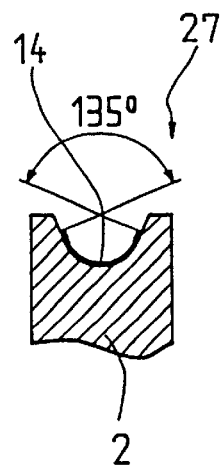
FIG. 3c is an enlarged fragmentary cross-sectional view of a traction sheave rope groove according to a third embodiment of the present invention.

Cut on the surface of the outer circumference of the traction sheave 2 formed by the cylindrical surface of the rim 11, at regular distances from each other in the direction of the axis, are the five rope grooves 7, 17 and 27 which, according to the present invention and as described in greater detail below, all have a plasma coating 14 on the groove walls (FIGS. 3a–3c). In elevator construction hitherto, traction sheaves with from two to twelve grooves have been usual. In the embodiment described here by reference to FIG. 2, the center groove 7, the intermediate grooves 17 and the outer grooves 27 have a semicircular profile (FIGS. 3a–3c). However, other shapes of groove are also possible which the specialist knows and can provide according to the form of rope cross section being used in each case, without the essence of the invention thereby changing. Examples of these alternate groove shapes are shown in FIGS. 4a–4f and described further below.

The rope drive 1 is designed in the usual manner so that for the various hoisting situations, e.g. normal travel, emergency stopping, loading, and unloading, sufficient tractive capacity is always present. To create the necessary, or maximum, tractive or drive capacity, i.e. also to keep the tractive capacity within relatively narrow limits for the fully synthetic suspension means which have become known, on the embodiments according to FIG. 2 the surfaces of the grooves of the traction sheave 2 according to the invention are partially or completely coated with the plasma coating 14.

Partial coating of the grooves 7, 17 and 27 with plasma serves the purpose of using this to fulfil a desired functional requirement for a load-dependent distribution of specific pressure over the cross-section of the shaped groove to effect the tractive behavior of the rope 4.

As it runs over the traction sheave 2, the synthetic fiber rope 4 adapts itself to the profile of the associated one of the semicircular grooves 7, 17 and 27 and under load deforms on the contact surface, or in the profiled groove, from its original circular shape to an oval section. According to the deformation, the specific pressures of the rope 4 in the one of the rope grooves 7, 17 and 27 over the cross section of the groove are not constant but increase toward the base of the groove. This distribution of the specific pressures is more pronounced with a greater load on the rope 4.

Taking an embodiment of the traction sheave 2 according to the invention with semicircular shaped grooves, in the rope groove 7 shown in FIG. 3a the plasma coating 14 is limited to an angular range of a maximum of 45° on the bed of the groove. The coating of the bed of the groove is not limited to the angular range of 45° stated here; on the contrary, to obtain a desired frictional force the angular range of coating in the bed of the groove can be correspondingly selected. The system coefficient of friction of this rope groove 7 is consequently high at the base of the groove and decreases toward the two sides. Correspondingly, the tractive behavior of a synthetic fiber rope 4 running in this groove 7 with no load on the rope is deliberately less pronounced than the greater load acting on the synthetic fiber rope 4 when the rope is pulled further into the shaped groove 7 and, as a result of the rope deformation previously mentioned, adapts particularly closely to the bed of the groove and lies in the bed of the groove with a maximum of contact pressure.

In the rope groove 17 illustrated in FIG. 3b, the coating 14 is formed over two flank areas each of 45° of the cross section of the semicircular groove and separated from each other by an angular range of 45°. A load-dependent tractive behavior is also obtained with the plasma coating 14 of parts of this rope groove 17. In contrast to the rope groove 7 described above, here only the bed of the groove is not coated with plasma. As a result, the traction of a synthetic fiber rope 4 running in a semicircular groove 17 having this form is less pronounced than that of the previous exemplary embodiment groove 7. On the other hand, the tractive behavior in the low-load range is largely independent of the environmental influences.

According to FIG. 3c, the plasma coating 14 of the rope groove 27 with an angular range of up to 140° (135° is shown) is applied over almost the entire cross section of the groove. A synthetic fiber rope 4 running in this shaped groove 27 displays according to the invention a pronounced tractive behavior at a high level which is independent of the rope load and the environmental influences acting on it. Instead of a complete coating of the groove surface, several locally limited areas in this angular range can be coated with plasma.

According to the present invention, by systematically arranging one or more of the differently coated rope grooves 7, 17 and 27 as described above on the traction sheave 2, the tractive behavior of the rope drive 1 can be systematically adapted to specified functional requirements.

Thanks to the surface roughness according to the present invention, which is here created by means of the plasma coating 14, the system coefficient of friction of the combination of the surface of the rope 4 and the running surface of the traction sheave 2 in the normal state is higher and remains constant at this level, even if lubricants or other liquids become present.

The surface finish of the rope running surfaces, here the rope grooves 7, 17 and 27, created by means of the plasma coating 14 according to the invention has peak-to-valley heights and grain sizes that are adapted depending on the wear and/or functional specifications to the Shore hardness of the rope sheath or the sheath of the covering layer of strands of polyurethane, polyamide, or similar. In this respect, for smaller peak-to-valley heights (lower Ra values) a friction material has to be provided which has a lower Shore hardness. Similarly, for higher Shore hardnesses, harder synthetic materials have to be provided.

A suitable material for the plasma coating 14 is corundum. The surface roughness of the plasma coating 14 combined with completely synthetic hoisting ropes 4 has a roughness grade lying in the range N7 to N12 which corresponds to an average surface peak-to-valley height of Ra=1.6 to 50 $\mu$m. In the embodiment illustrated in FIGS. 1 through 3c, an N9 plasma coating 14 is combined with a synthetic rope sheath with a Shore hardness "A". On the other hand, surface roughnesses of N10 and above should be combined with rope sheaths with greater hardness, e.g. Shore hardness "D".

Figure 4A:
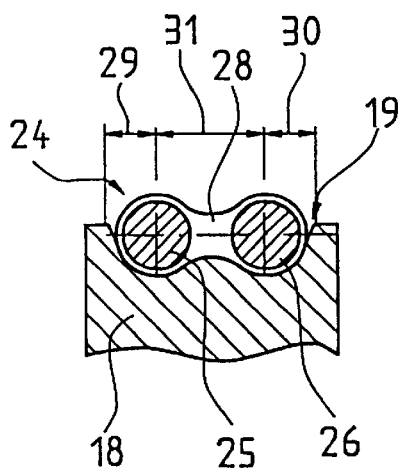
FIG. 4a is an enlarged fragmentary cross-sectional view of a fourth embodiment of a traction sheave double rope groove with a twin rope according to the present invention.
Figure 4B:
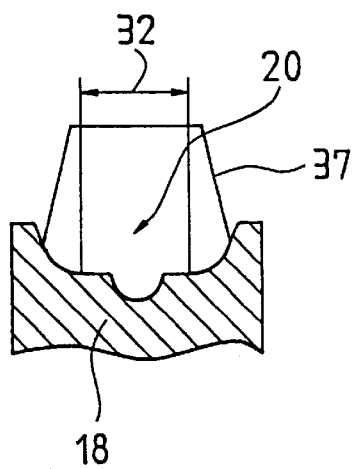
FIG. 4b is an enlarged fragmentary cross-sectional view of a fifth embodiment of a traction sheave double rope groove according to the present invention.
Figure 4C:
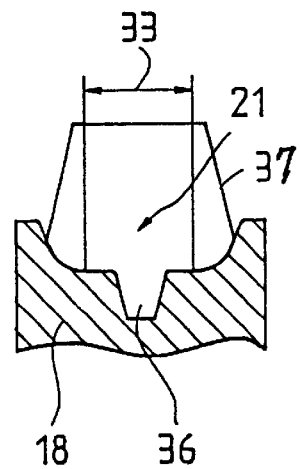
FIG. 4c is an enlarged fragmentary cross-sectional view of a sixth embodiment of a traction sheave double rope groove according to the present invention.
Figure 4D:
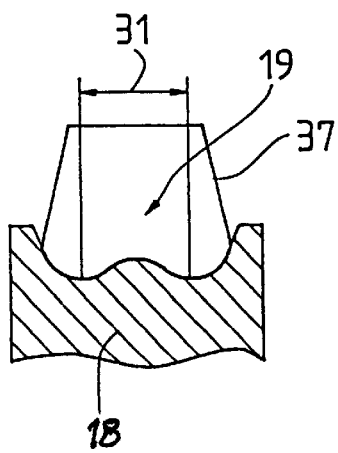
FIG. 4d is similar to FIG. 4a with the rope removed.
Figure 4E:
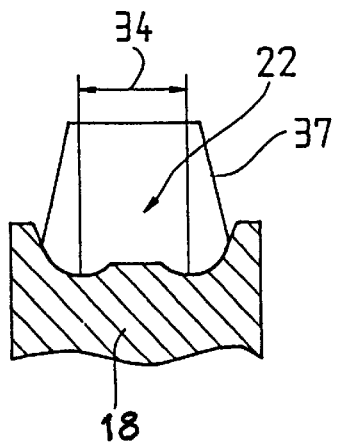
FIG. 4e is an enlarged fragmentary cross-sectional view of a seventh embodiment of a traction sheave double rope groove according to the present invention.
Figure 4F:
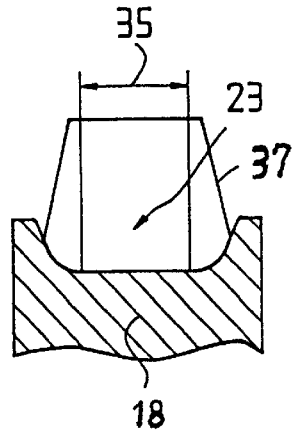
FIG. 4f is an enlarged fragmentary cross-sectional view of an eighth embodiment of a traction sheave double rope groove according to the present invention.

In FIGS. 4a to 4f, exemplary embodiments of a rope sheave 18 according to the invention are illustrated with twin grooves 19, 20, 21, 22 and 23 in which, as shown in exemplary manner in FIG. 4a, a so-called twin rope 24 runs. The twin rope 24 is symmetrically constructed from two multilayer synthetic fiber stranded ropes 25 and 26 twisted in opposite directions of twist, which are joined together by a common rope sheath 28 into the non-rotating twin rope 24 having a cross-section in the form of a dumbbell. The shape of the double groove 19 is made complementary to the contour of the respective twin rope 24. The shape of the double groove 19, 20, 21, 22 and 23 along the direction of the axis of rotation of the rope sheave 18 consists in each case of a central section and two outer profiles 29 and 30 with the respective central section 31, 32, 33 and 34 between them. The outer profiles 29 and 30 are in each case formed from one half of a semicircular groove and are identical in all the embodiments illustrated in FIGS. 4a–4f. The central section 31 (FIGS. 4a and 4d) has a contour with outward radial curvature whereas the central section 32 of the double groove 20 is curved radially inward (FIG. 4b). The double groove 21 illustrated in FIG. 4c has the central section 33 which forms a radially inward-directed channel 36. In FIG. 4d, the double groove 19 from FIG. 4a is shown without the twin rope 24 lying in it. In FIG. 4e, the double groove 22 has the central section 34 with a trapezoid form radially directed outward. In FIG. 4f, the double groove 23 has two outer parts of a semicircular groove joined to each other in a straight line by the flat, level central section 35. According to the present invention, in an area 37, all the double-grooved embodiments 19, 20, 21, 22 and 23 are provided with the rope running surface according to the invention by means of the plasma coating 14. As on the exemplary embodiments described earlier, this can take the form of a coating of the complete groove surface or of a number of locally limited areas.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A rope drive apparatus for driving a synthetic fiber rope comprising:
    a traction sheave having at least one circumferential groove formed therein for receiving a synthetic fiber rope; and
    a running surface of said groove for contact with the synthetic fiber rope and having at least a portion thereof with a surface roughness grade in a range of N7 to N12.

2. The rope drive apparatus according to claim 1 wherein said running surface of said circumferential groove extends over an angular range of up to 45° extending parallel to an axis of rotation of said traction sheave.

3. The rope drive apparatus according to claim 1 wherein said running surface of said circumferential groove extends over an angular range of up to 140° extending parallel to an axis of rotation of said traction sheave.

4. The rope drive apparatus according to claim 1 wherein said running surface of said circumferential groove extends over two spaced flank areas extending parallel to an axis of rotation of said traction sheave.

5. The rope drive apparatus according to claim 4 wherein said flank areas are symmetrical and each extends over an angular range of up to 45° extending parallel to an axis of rotation of said traction sheave.

6. The rope drive apparatus according to claim 1 wherein said traction sheave has at least two of said circumferential grooves formed therein.

7. The rope drive apparatus according to claim 1 wherein said traction sheave has at least three of said circumferential grooves formed therein each having an associated one of said running surfaces, said running surface associated with at least one of said circumferential grooves being shaped differently from said running surface associated with at least another one of said circumferential grooves.

8. The rope drive apparatus according to claim 1 wherein said running surface is formed as a material coating with a peak-to-valley height of Ra=1.6 to 50 μm.

9. A rope drive apparatus comprising:
    a traction sheave having at least one circumferential groove formed therein;
    a synthetic fiber rope received in said groove; and
    a running surface of said groove in contact with said synthetic fiber rope and having at least a portion thereof with a surface roughness grade in a range of N7 to N12.

10. The rope drive apparatus according to claim 9 wherein said running surface portion has a roughness average Ra=6.3 and said synthetic fiber rope has a sheath with a Shore hardness "A".

11. The rope drive apparatus according to claim 9 wherein said running surface portion has a roughness average of at least Ra=12.5 and said synthetic fiber rope has a sheath with a Shore hardness "D".

12. A method of manufacturing a traction sheave for drive machines for hoisting synthetic fiber hoisting ropes comprising the steps of:
    a. forming a circumferential groove in a traction sheave for receiving a multilayer stranded synthetic fiber rope; and
    b. forming a running surface in the groove for contact with the synthetic fiber rope, at least a portion of said running surface having a roughness grade in a range of N7 to N12.

13. The method according to claim 12 wherein said running surface portion is formed by applying a coating material to a surface of the groove.

14. The method according to claim 13 wherein said coating material is corundum.

15. The method according to claim 13 wherein said coating material is applied as a plasma.

* * * * *